United States Patent [19]

Mutoh et al.

[11] Patent Number: 4,838,840
[45] Date of Patent: Jun. 13, 1989

[54] AUTOMATIC BELT TENSIONER

[75] Inventors: Naoto Mutoh, Fuchu; Juji Ojima, Kanagawa, both of Japan

[73] Assignees: Fuji Jukogyo Kabushiki Kaisha, Tokyo; NHK Spring Co., Ltd., Yokohama, both of Japan

[21] Appl. No.: 168,228

[22] Filed: Mar. 15, 1988

[30] Foreign Application Priority Data

Mar. 23, 1987 [JP] Japan .................. 62-068713

[51] Int. Cl.⁴ ............................... F16H 7/12
[52] U.S. Cl. ...................... 474/138; 474/110
[58] Field of Search ............... 474/109–111, 474/133, 135, 136, 138, 101, 117, 118; 267/136, 137

[56] References Cited

U.S. PATENT DOCUMENTS 4,747,811  5/1988  Sawafuji et al. ............... 474/138 X

FOREIGN PATENT DOCUMENTS 58-24666  5/1983  Japan .

Primary Examiner—Thuy M. Bui
Attorney, Agent, or Firm—Martin A. Farber

[57] ABSTRACT

A belt tensioner has a shaft having an external thread and rotatably mounted in a body, a torsion spring provided between the body and the shaft so as to urge the shaft in a rotational direction, and a cylindrical rod having an internal thread engaged with the external thread of the shaft. A lower end of the rod is projected from the body so as to be operatively connected to a tension pulley for a belt. The torsion spring and both the threads are arranged to project the rod by the rotation of the shaft urged by the torsion spring. The rod is secured to the body so as to be adjusted in angular disposition.

11 Claims, 3 Drawing Sheets

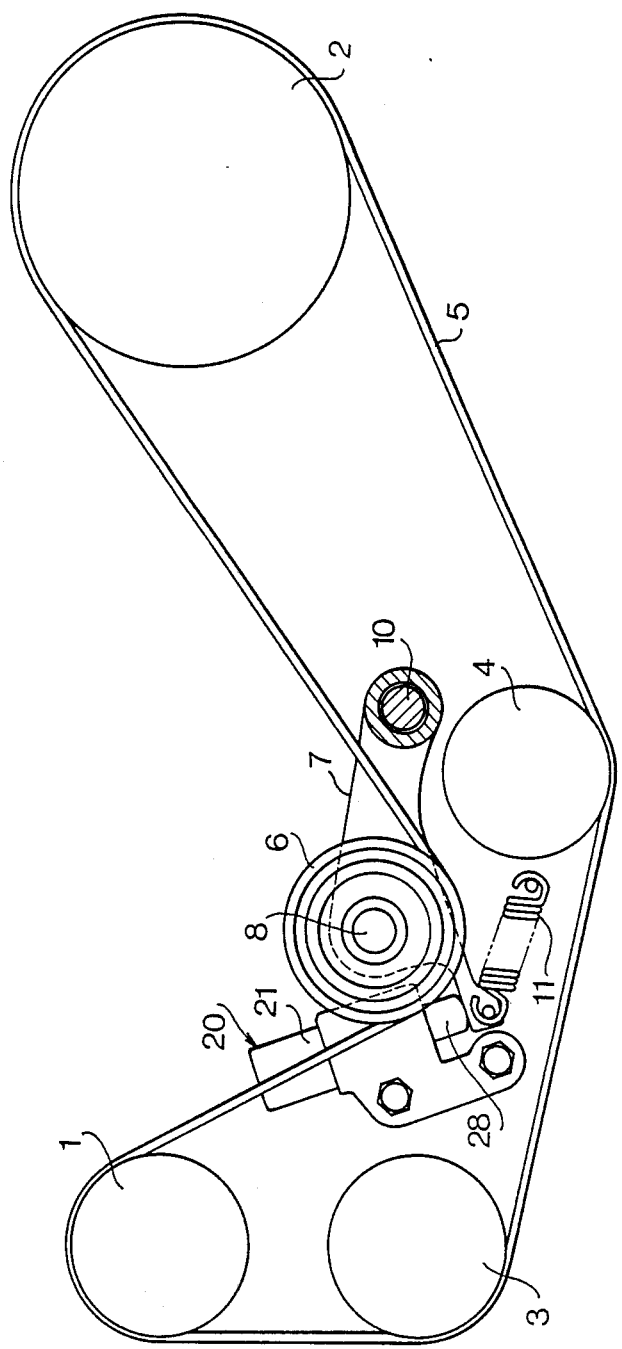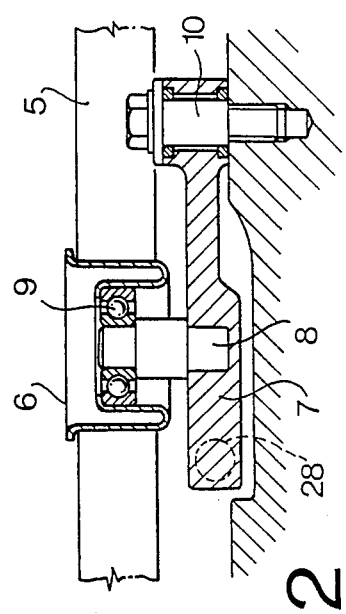
FIG. 1
FIG. 2

AUTOMATIC BELT TENSIONER

BACKGROUND OF THE INVENTION

The present invention relates to an automatic tensioner for tensing a belt such as a timing belt for an automotive engine and more particularly to a spring loaded screw type tensioner.

Japanese Patent Publication No. 58-24666 discloses a screw type tensioner applied to chain driven camshaft mechanisms. The tensioner has a shaft rotatably mounted in a cylindrical body and applied with torque by a torsion spring, and an actuating rod having a female thread engaged with a male thread of the shaft. The shaft is urged by the torsion spring in a rotational direction to project the actuating rod. When the tension of a chain decreases as a result of the expansion of the chain, the rod is projected by the rotation of the shaft to push a chain guide, thereby automatically tensing the chain.

When assembling such a spring loaded screw type tensioner, the shaft is rotated to twist the torsion spring to cause a predetermined torsion in the spring and held at a certain position to keep the torsion. On the other hand, the rod is screwed in the innermost portion of the shaft and restrained from rotating relative to the shaft. After attaching the tensioner to a body of the engine and abutting against an arm of a tension pulley, the shaft and the rod are released. Thus, the rod is pressed against the arm by the thrust which is converted from the torsion of the spring.

However, the tensioner is not always assembled to have a predetermined thrust, because of variances in accuracy of the elements such as an engaging portion of the shaft and rod. However, it is difficult to manufacture tensioners without variances in dimension.

SUMMARY OF THE INVENTION

An object of the present invention is to provide a spring loaded screw type tensioner wherein thrust for tensing a belt can be finely adjusted after assembling the tensioner.

The other objects and features of this invention will become understood from the following description with reference to the accompanying drawings.

BRIEF DESCRIPTION OF THE DRAWINGS

FIG. 1 is a side view showing a timing belt drive device for an engine to which the present invention is applied;

FIG. 2 is a sectional view of a part of FIG. 1;

DETAILED DESCRIPTION OF THE INVENTION

Figure 3:
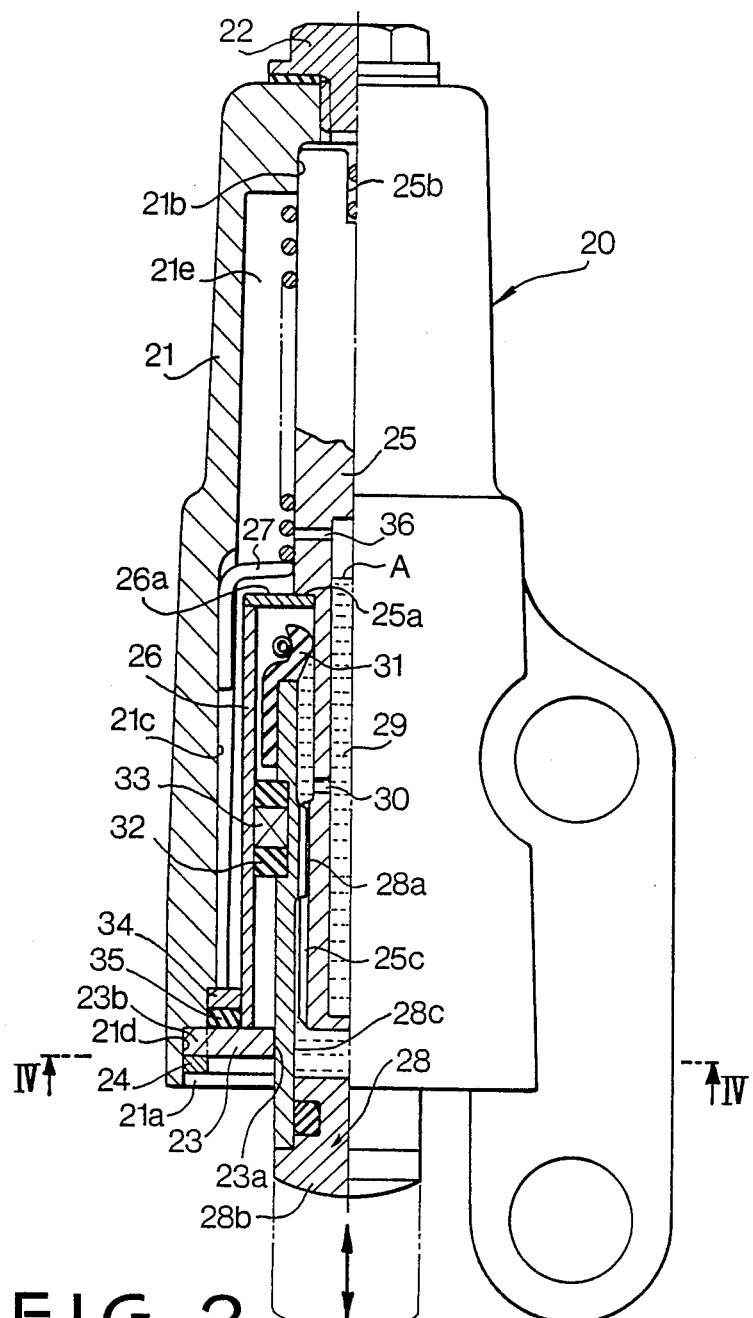
FIG. 3 is a fragmentary sectional view of an automatic tensioner of the present invention.

Referring to FIGS. 1 and 2, a crankshaft pulley 1 is connected to a camshaft pulley 2 through a toothed timing belt 5. An oil pump pulley 3 and an idler pulley 4 engage with the belt at the tight side of the run of the belt 5. A tension pulley 6 bears on the belt 5 at the slack side. The tension pulley 6 is rotatably supported on a central portion of an arm 7 through a bearing 9 mounted on a shaft 8. One end of the arm 7 is rotatably secured to an engine body by a shaft 10. An automatic tensioner 20 is provided adjacent to an upper side of the other end of the arm 7. A tension spring 11 is provided to urge the arm 7 to assist the automatic tensioner 20 so as to decrease the vibration of the belt.

Figure 4:
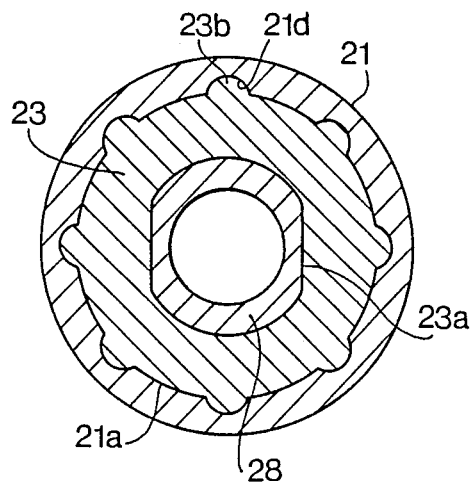
FIG. 4 is a sectional view taken along a line IV—IV of FIG. 3

Referring to FIGS. 3 and 4 the automatic tensioner 20 has a vertical cylindrical body 21 having an axial chamber 21e. A bolt 22 is screwed in the body 21 to cover an opening at the top of the body 21.

A shaft 25 is axially disposed in the chamber 21e of the body 21. An upper portion of the shaft 25 is rotatably mounted in a recess 21b formed in the body 21. The upper half of the shaft 25 has a large diameter thereby forming a circular corner portion 25a, the underside of which engages with a shoulder 26a of a cylindrical stopper 26 axially provided in the body 21. Disposed around the upper half of the shaft 25 is a torsion spring 27, one end of which is engaged with a bore 25b formed on the top of the shaft 25 and the other end to a groove 21c formed in the inner wall of the body 21, so as to apply torque to the shaft 25. An external square thread 25c is formed on a lower periphery of the shaft 25. An oil reservoir 29 wherein a low viscosity lubricating oil A is contained is formed within the shaft 25.

A cylindrical rod 28 has a bore 28c and an internal thread 28a at an intermediate position with respect to the axial length of the bore 28c. The rod 28 is provided in the stopper 26, engaging the thread 28a with the thread 25c of the shaft 25. The rod 28 projects downwardly out of the body 21. A head portion 28b is formed at the bottom end for abutting against the arm 7.

A radial oil passage 30 is formed in the wall of the shaft 25 at a portion above the engaging portion of the threads 25c and 28a so as to communicate the oil reservoir 29 with a space formed between the shaft 25 and the rod 28. A stem seal 31 is mounted between the top end of the rod 28 and the shaft 25 so as to prevent the oil from leaking out of the rod 28. Provided at a middle portion with respect to the axial direction of the rod 28 between the stopper 26 and the rod 28 is an oil seal 33 which is secured by back-up rings 32. Thus, the oil is prevented from leaking out of the stopper. An oil seal 34 and an O-ring 35 are provided in a space between the body 21 and the stopper 26 thereby preventing the leakage of oil from the body 21. A radial air passage 36 is formed in the wall of the shaft 25 at a portion above the level of the oil A.

As shown in FIG. 4, a circular bearing plate 23 is formed with an elongated guide opening 23a at the center and having a plurality of angularly regular spaced lugs 23b on the periphery thereof. The bearing plate 23 is engaged with the rod 28 at the opening 23a and inserted in an opening 21a formed in a low end portion of the body 21. Each lug 23b engages with a corresponding indentation 21d formed in the opening 21a. The bearing plate 23 is secured thereto by a snap ring 24. A lower portion of the rod 28 has a cross section having a contour corresponding to the shape of the opening 23a of the bearing plate 23, so that the rod 28 can be axially moved without rotating. The bearing plate 23 supports the stopper 26 and hence the shaft 25. The torsion spring 27 and threads 25c and 28a are so arranged that when the shaft 25 is rotated by spring 27, the rod 28 projects as shown by a chain line in FIG. 3

For assembling the automatic tensioner 20, the rod 28 is screwed in the inner position, and further rotated, so that the shaft 25 is rotated to twist the torsion spring 27, thereby causing a predetermined torsion in the spring 27. At that position, the bearing plate 23 is engaged with the walls of the opening 21a and indentations 21d. When the rod 28 is released with respect to the axial direction, shaft 25 is rotated by the spring 27, so that the rod 28 is projected by the component at the thread 28a. When the rod is not projected a predetermined length, the bearing plate 23 is disengaged from the body 21, and rotated together with the rod 28 with respect to the shaft 25 so that the projected length can be set to the predetermined value. At the position, the bearing plate 23 is engaged with the walls of opening 21a and indentations 21d. Thus, the automatic tensioner 20 is assembled.

The automatic tensioner 20 is attached to the engine, and the rod 28 is engaged with an end portion of the arm 7 as shown in FIG. 1. Thus, the tension pulley 6 is urged against the timing belt 5. At a position where the component of rotary force at the thread 28a generated by the reaction of the belt 5 balances with the torque of the torsion spring 27, the tension pulley 6 is held to provide a proper belt tension. When the crankshaft pulley 1 is rotated, the timing belt 5 guided by the idler pulley 4 and the tension pulley 6 drives the camshaft pulley 2 and the oil pump pulley 3 in synchronism with the crankshaft pulley 1.

When load on the slack side of the belt 5 is decreased, for example, at the start of the engine, rod 28 is temporarily projected. During the normal operation of the engine, the rod 28 is projected and retracted in accordance with expansion of the belt at warm-up and with contraction of the belt 5 at cold starting. Accordingly, the tension of the belt 5 is automatically kept at a predetermined value by the tension pulley 6.

When the rod 28 is projected, increasing the volume of the space in the rod, oil A in the oil reservoir 29 flows through the oil passage 30 into the space. At the same time, air is induced into the oil reservoir 29 through the air passage 36.

To the contrary, when the rod 28 is retracted, decreasing the space, the oil A in the space returns to the oil reservoir 29 through the passage 30 while the air in the oil reservoir 29 is discharged through the air passage 36. Since the level of the oil A is always above the threads 28a and 25c, the threads are thoroughly lubricated. Accordingly, the particles caused by abrasion of the threads heap up on the bottom of the space in the rod 28.

The oil in the rod 28 is prevented from leaking with the stem seal 31. Even if excessive oil is discharged out of the rod 28, oil seals 33 and 34 stop the flow out of the body 21.

In accordance with the present invention, there is provided an automatic tensioner wherein thrust which is applied to the rod can be easily adjusted when assembling the tensioner. In addition, the dimensions of the parts of the tensioner need not be precisely manufactured, so that production management becomes easy.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:
1. An automatic belt tensioner comprising:
a cylindrical body having an axial chamber;
a shaft having an external thread and rotatably mounted in the chamber of the body;
a torsion spring provided between the body and the shaft so as to urge the shaft in a rotational direction;
a cylindrical rod having an internal thread engaged with the external thread of the shaft;
a lower end of the rod being projected from the body so as to be operatively connected to a tension pulley for a belt;
a bearing plate having a noncircular opening engaged with the rod so as to permit axial movement of the rod;
a plurality of lugs radially projecting from the periphery of the bearing plate;
the cylindrical body having an opening and a plurality of indentations formed on a circular inside wall of the opening, the periphery of the bearing plate being detachably engaged with the opening of the cylindrical body and the lugs being engaged with the indentations, thereby holding the bearing plate and permitting angular disposition of the bearing plate so that projected length of the rod is adjusted.

2. An automatic belt tensioner according to claim 1, further comprising
snap ring means for securing the bearing plate in the opening of the cylindrical body.

3. An automatic belt tensioner according to claim 1, wherein
said opening of the cylindrical body extends to a free end of the cylindrical body adjacent the projected length of the rod.

4. An automatic belt tensioner according to claim 3, further comprising
snap ring means for securing the bearing plate in the opening of the cylindrical body.

5. An automatic belt tensioner according to claim 1, wherein
said bearing plate is flat in its entirety.

6. An automatic belt tensioner comprising:
a cylindrical body having an axial chamber;
a shaft having an external thread and rotatably mounted in the chamber of the body;
a torsion spring provided between the body and the shaft so as to urge the shaft in a rotational direction;
a cylindrical rod having an internal thread engaged with the external thread of the shaft;
a lower end of the rod being projected from the body so as to be operatively connected to a tension pulley for a belt;
a bearing plate having a noncircular opening engaged with the rod so as to permit axial movement of the rod;
the cylindrical body having an opening and a circular inside wall of the opening, the periphery of the bearing plate and the circular inside wall of the opening constitute cooperating members;
a plurality of projections projecting from one of the cooperating members; and a plurality of indentations formed on the other of the cooperating members;
the periphery of the bearing plate being detachably engaged with the opening of the cylindrical body and the projections being engaged with the indentations, thereby holding the bearing plate and permitting angular disposition of the bearing plate relative to the cylindrical body so that projected length of the rod is adjustable.

7. An automatic belt tensioner according to claim 6, further comprising snap ring means for securing the bearing plate in the opening of the cylindrical body.

8. An automatic belt tensioner according to claim 6, wherein said opening of the cylindrical body extends to a free end of the cylindrical body adjacent the projected length of the rod.

9. An automatic belt tensioner according to claim 8, further comprising snap ring means for securing the bearing plate in opening of the cylindrical body.

10. An automatic belt tensioner according to claim 6, wherein said bearing plate is flat in its entirety.

11. An automatic belt tensioner according to claim 6, wherein the projections and indentations are rounded.

* * * * *